United States Patent
Kuros et al.

(10) Patent No.: US 11,592,104 B1
(45) Date of Patent: Feb. 28, 2023

(54) METHOD OF TRANSMISSION CONTROL IN ORDER TO PROTECT CLUTCHES FROM DAMAGE

(71) Applicant: CNH Industrial America LLC, New Holland, PA (US)

(72) Inventors: Pawel Kuros, Mt. Prospect, IL (US); Kenneth Scott Hedderman, Chicago, IL (US); Alek Czernobil, Lemont, IL (US); Garth H. Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/499,482

(22) Filed: Oct. 12, 2021

(51) Int. Cl.
| | |
|---|---|
| *F16H 59/46* | (2006.01) |
| *F16H 59/38* | (2006.01) |
| *F16H 59/70* | (2006.01) |
| *F16H 61/18* | (2006.01) |
| *F16H 61/02* | (2006.01) |
| *F16H 59/36* | (2006.01) |

(52) U.S. Cl.
CPC ............ *F16H 59/46* (2013.01); *F16H 59/38* (2013.01); *F16H 59/70* (2013.01); *F16H 61/0213* (2013.01); *F16H 61/18* (2013.01); *F16H 2059/366* (2013.01); *F16H 2061/022* (2013.01)

(58) Field of Classification Search
CPC .......... F16H 59/38; F16H 59/46; F16H 59/70; F16H 2059/366; F16H 61/0213; F16H 61/18; F16H 2061/022
See application file for complete search history.

(56) References Cited

U.S. PATENT DOCUMENTS

| | | | |
|---|---|---|---|
| 3,927,579 A | 12/1975 | Golan | |
| 5,609,548 A * | 3/1997 | White | B60W 10/11 |
| | | | 477/906 |
| 6,537,177 B2 | 3/2003 | Degroot et al. | |
| 7,900,533 B2 | 3/2011 | Shiiba et al. | |
| 9,121,496 B2 | 9/2015 | Kwasniewski | |
| 2009/0319145 A1* | 12/2009 | Kulas | F16H 61/16 |
| | | | 701/62 |

(Continued)

FOREIGN PATENT DOCUMENTS

| | | |
|---|---|---|
| JP | 2797799 B2 | 9/1998 |
| JP | 3642668 B2 | 4/2005 |

*Primary Examiner* — Edwin A Young
(74) *Attorney, Agent, or Firm* — Rickard DeMille; Rebecca Henkel (57) ABSTRACT

A system includes a driveline, a user interface, and a control system. The driveline includes an engine, a transmission, and a clutch positioned to selectively couple the engine to the transmission. The user interface is configured to facilitate operator shifting of the transmission. The control system is configured to perform a transmission auto-shift procedure where the control system monitors engine speed of the engine for a period of time following completion of a downshift event with the transmission from a first, higher gear to a second, lower gear, compares the engine speed to at least one speed threshold, and automatically upshifts the transmission from the second, lower gear back to the first, higher gear (i) following expiration of the period of time and/or (ii) in response to the engine speed exceeding the at least one speed threshold during the period of time.

20 Claims, 5 Drawing Sheets

(56) References Cited

U.S. PATENT DOCUMENTS

| | | |
|---|---|---|
| 2010/0250050 A1 | 9/2010 | Ayabe |
| 2013/0166171 A1* | 6/2013 | Hartman ............... B60W 10/06 |
| | | 701/102 |
| 2016/0033039 A1* | 2/2016 | Yamasaki ............... F16H 59/70 |
| | | 477/107 |

* cited by examiner

METHOD OF TRANSMISSION CONTROL IN ORDER TO PROTECT CLUTCHES FROM DAMAGE

BACKGROUND

Machinery and vehicles often include drivelines that have an engine, a transmission, and a clutch that selectively couples the engine to the transmission. However, circumstances can arise during a downshift event with the transmission that causes the engine to overspeed (e.g., downshifting while going downhill), which can damage the clutch and/or the transmission.

SUMMARY

One embodiment relates to a system. The system includes a driveline, a user interface, and a control system. The driveline includes an engine, a transmission, and a clutch positioned to selectively couple the engine to the transmission. The user interface is configured to facilitate operator shifting of the transmission. The control system is configured to perform a transmission auto-shift procedure where the control system monitors engine speed of the engine for a period of time following completion of a downshift event with the transmission from a first, higher gear to a second, lower gear, compares the engine speed to at least one speed threshold, and automatically upshifts the transmission from the second, lower gear back to the first, higher gear (i) following expiration of the period of time and/or (ii) in response to the engine speed exceeding the at least one speed threshold during the period of time.

Another embodiment relates to a method for performing an auto-shift procedure of a transmission of a machine. The method includes monitoring, by a processing circuit, engine speed of an engine of the machine for a period of time following completion of a shift event with the transmission from a first gear to a second gear; comparing, by the processing circuit, the engine speed during the period of time to a speed threshold; and automatically shifting, by the processing circuit, the transmission from the second gear back to the first gear (i) following expiration of the period of time and (ii) in response to the engine speed not satisfying the speed threshold during the period of time.

Still another embodiment relates to a system. The system includes a control system configured to perform a transmission auto-shift procedure. The control system, when performing the transmission auto-shift procedure, monitors engine speed of the engine for a period of time following completion of a shift event with the transmission from a first gear to a second gear, compares the engine speed to a speed threshold, and automatically returns the transmission from the second gear back to the first gear (i) following expiration of the period of time and (ii) in response to the engine speed not satisfying the speed threshold during the period of time.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a driveline and a control system. The driveline includes an engine, a transmission, and a clutch selectively coupling the engine to the transmission. The control system is configured to monitor operational characteristics of the vehicle (e.g., clutch engagement/disengagement, gear selection of the transmission, engine speed, direction of travel (forward or reverse), etc.) during a transmission shift event (e.g., a downshift event, etc.) and determine whether to implement an automatic shift (e.g., upshift, etc.) or to maintain the selected gear based on the operational characteristics.

Overall Vehicle

Figure 1:
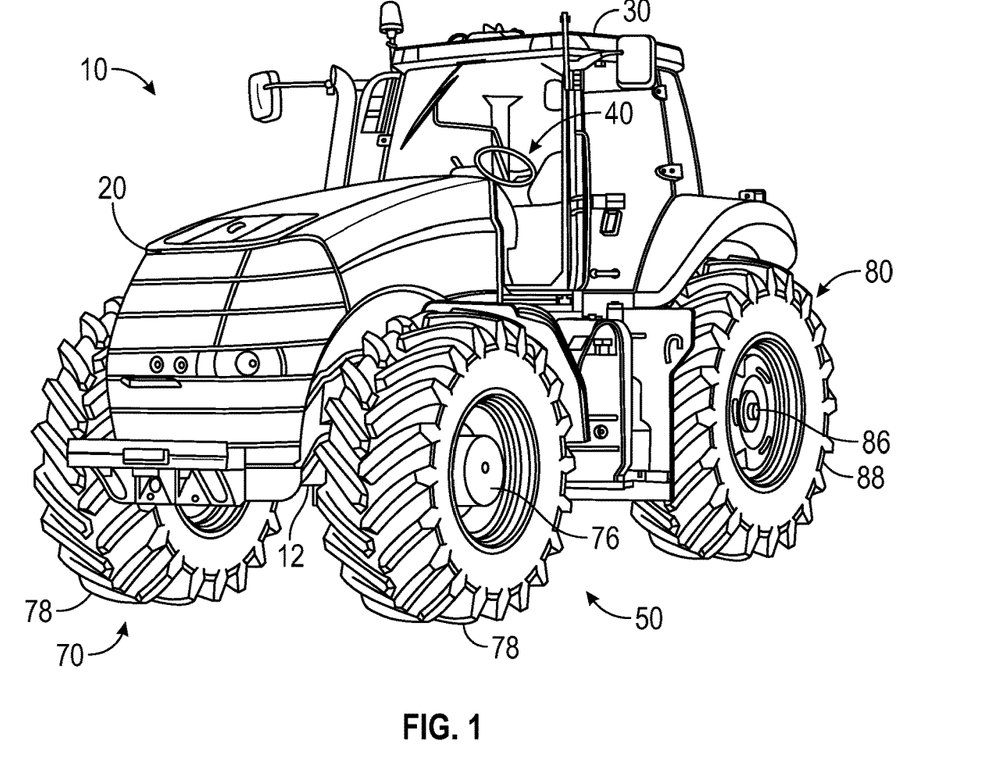
FIG. 1 is a perspective view of a vehicle, according to an exemplary embodiment.
Figure 2:
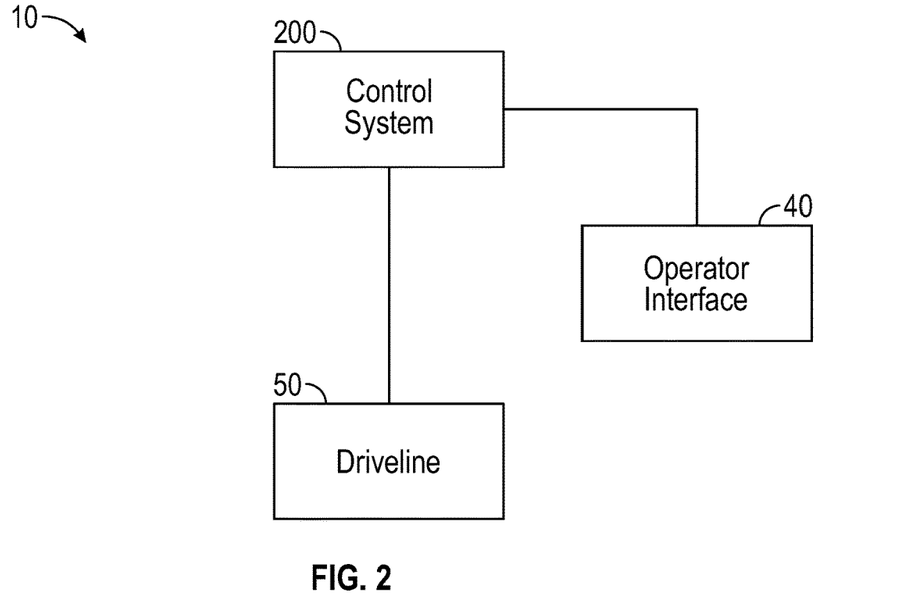
FIG. 2 is a schematic block diagram of the vehicle of FIG. 1, according to an exemplary embodiment.
Figure 3:
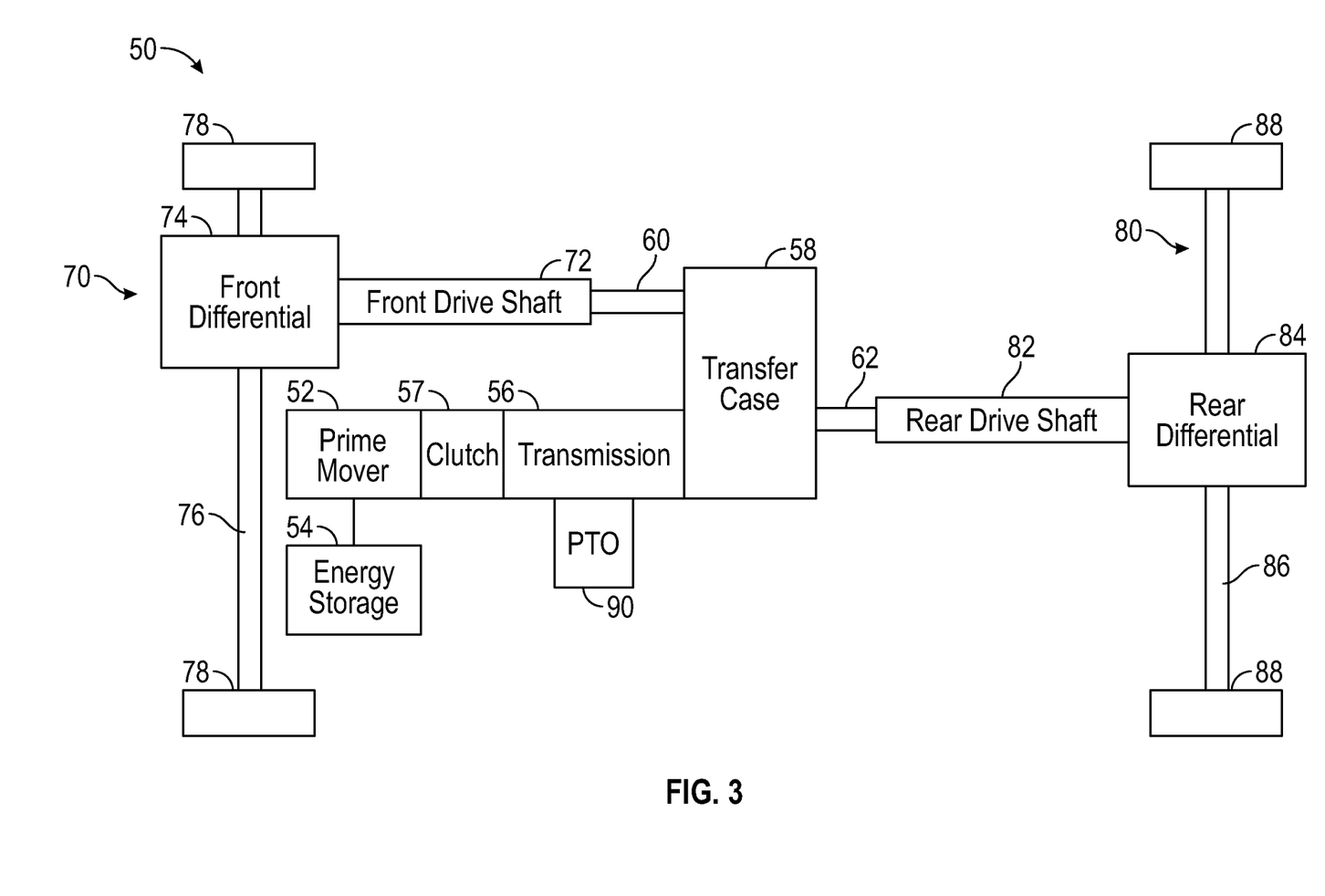
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; and a vehicle control system, shown as control system 200, coupled to the operator interface 40 and the driveline 50. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, shift a transmission, engage/disengage a clutch, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, a clutch pedal, an electronic gear shifter/selector, a mechanical gear shifter/selector, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a clutch, shown as clutch 57, positioned between the prime mover 52 and the transmission 56; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. According to an exemplary embodiment, the clutch 57 is configured to facilitate selectively coupling the prime mover 52 to and selectively decoupling the prime mover 52 from the transmission 56. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the vehicle 10 includes a braking system that includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Control System

Figure 4:
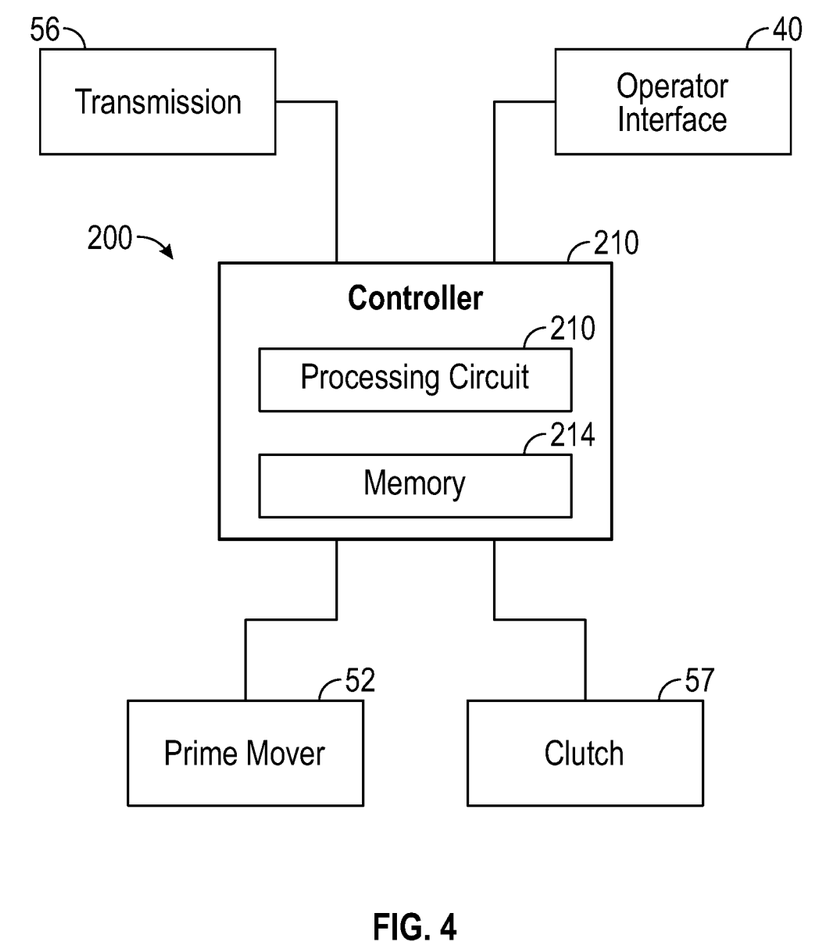
FIG. 4 is a schematic block diagram of a control system of the vehicle of FIG. 1, according to an exemplary embodiment.

According to the exemplary embodiment shown in FIG. 4, the control system 200 for the vehicle 10 includes a controller 210. In one embodiment, the controller 210 is configured to selectively engage, selectively disengage, control, or otherwise communicate with components of the vehicle 10. As shown in FIG. 4, the controller 210 is coupled to (e.g., communicably coupled to) the operator interface 40, the prime mover 52, the transmission 56, and the clutch 57. By way of example, the controller 210 may send and receive signals (e.g., control signals, data, etc.) with the operator interface 40, the prime mover 52, the transmission 56, and/or the clutch 57.

The controller 210 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 4, the controller 210 includes a processing circuit 212 and a memory 214. The processing circuit 212 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212. In some embodiments, the controller 210 may represent a collection of processing devices. In such cases, the processing circuit 212 represents the collective processors of the devices, and the memory 214 represents the collective storage devices of the devices.

According to an exemplary embodiment, the clutch 57 includes a centrifugal head integrated relief port ("CHIRP"). The CHIRP is configured to open when the clutch 57 is disengaged and relive pressure from the clutch 57 (e.g., as the output of prime mover 52 and/or the input of the transmission 56 rotate), which prevents the clutch 57 from engaging when the prime mover 52 and/or the transmission 56 are running at a high speed. However, when the clutch 57 is engaged, the CHIRP will close and cannot relive pressure, which prevents the CHIRP from being able to facilitate disengagement of clutch 57 at high speeds (i.e., absent providing a clutch command signal to the clutch 57 to disengage, due to centrifugal pressure as a results of fast rotation). Accordingly, with the clutch 57 engaged and during a downshift event with the transmission 56, the speed of the prime mover 52 may increase, which can cause overspeeding of the clutch 57 and/or the transmission 56. Such overspeeding may cause degradation or risk of damage and, ultimately, failure of the clutch 57 and/or the transmission 56.

Accordingly, the control system 200 is configured to perform a transmission auto-shift procedure when the clutch 57 is engaged where the controller 210 is configured to monitor for overspeeding conditions during downshift events and upshift the transmission 56 upon detection of the overspeeding conditions to prevent a risk of damage to the clutch 57 and/or the transmission 56. According to an exemplary embodiment, the controller 210 is configured to monitor operational characteristics of the driveline 50 (e.g., engagement/disengagement of the clutch 57, gear selection of the transmission 56, speed of the prime mover 52, direction of travel (forward or reverse) of the vehicle 10, etc.) during a transmission shift event (e.g., a downshift event, etc.) and determine whether to implement an automatic shift (e.g., upshift, etc.) or to maintain the selected gear based on the operational characteristics. Further details regarding the transmission auto-shift procedure implemented by the control system 200 are provided herein with respect to method 300.

Figure 5A:
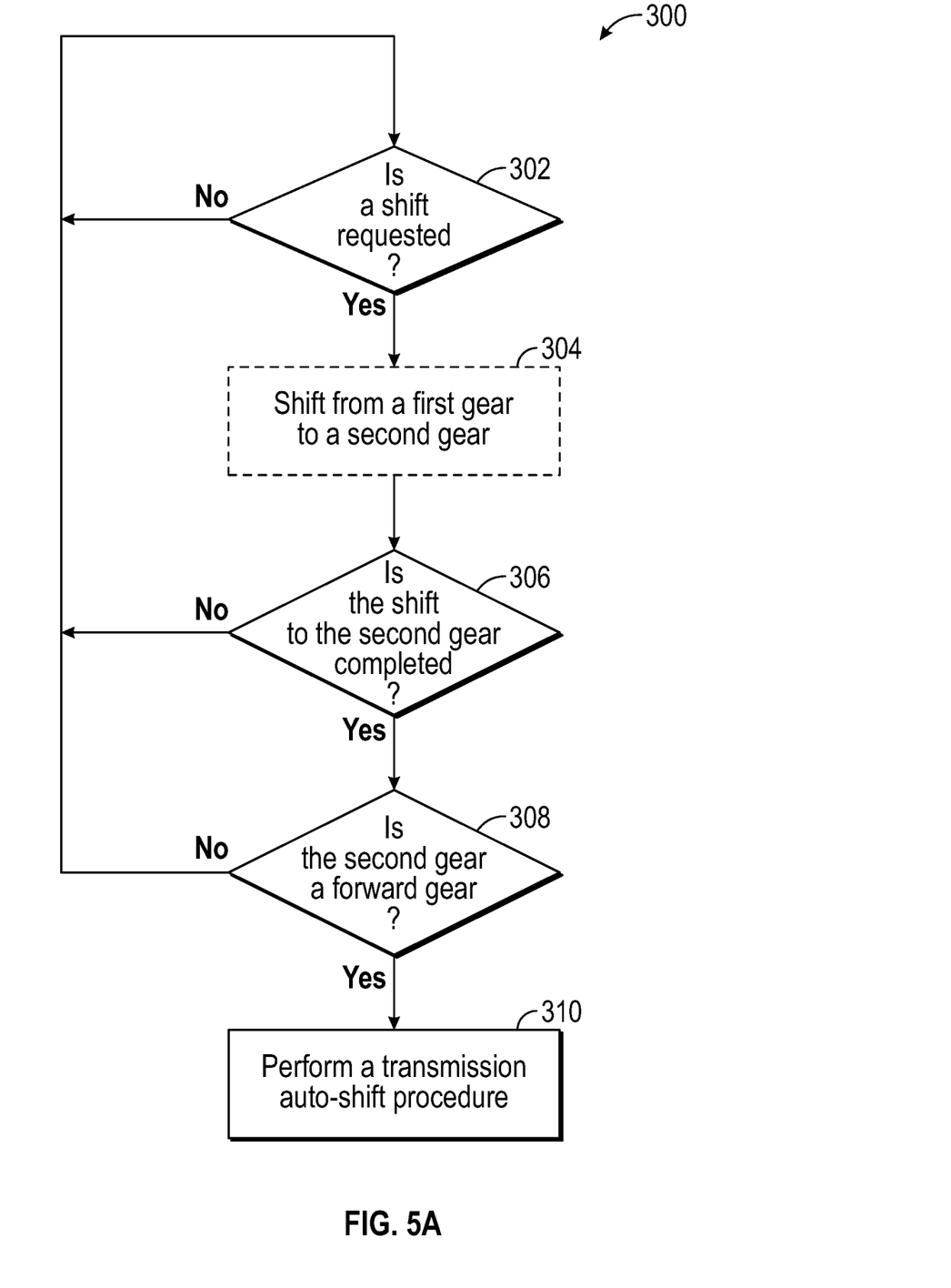
FIGS. 5A and 5B show a flow diagram of a method for controlling shifting of a transmission of the vehicle of FIG. 1, according to an exemplary embodiment.
Figure 5B:
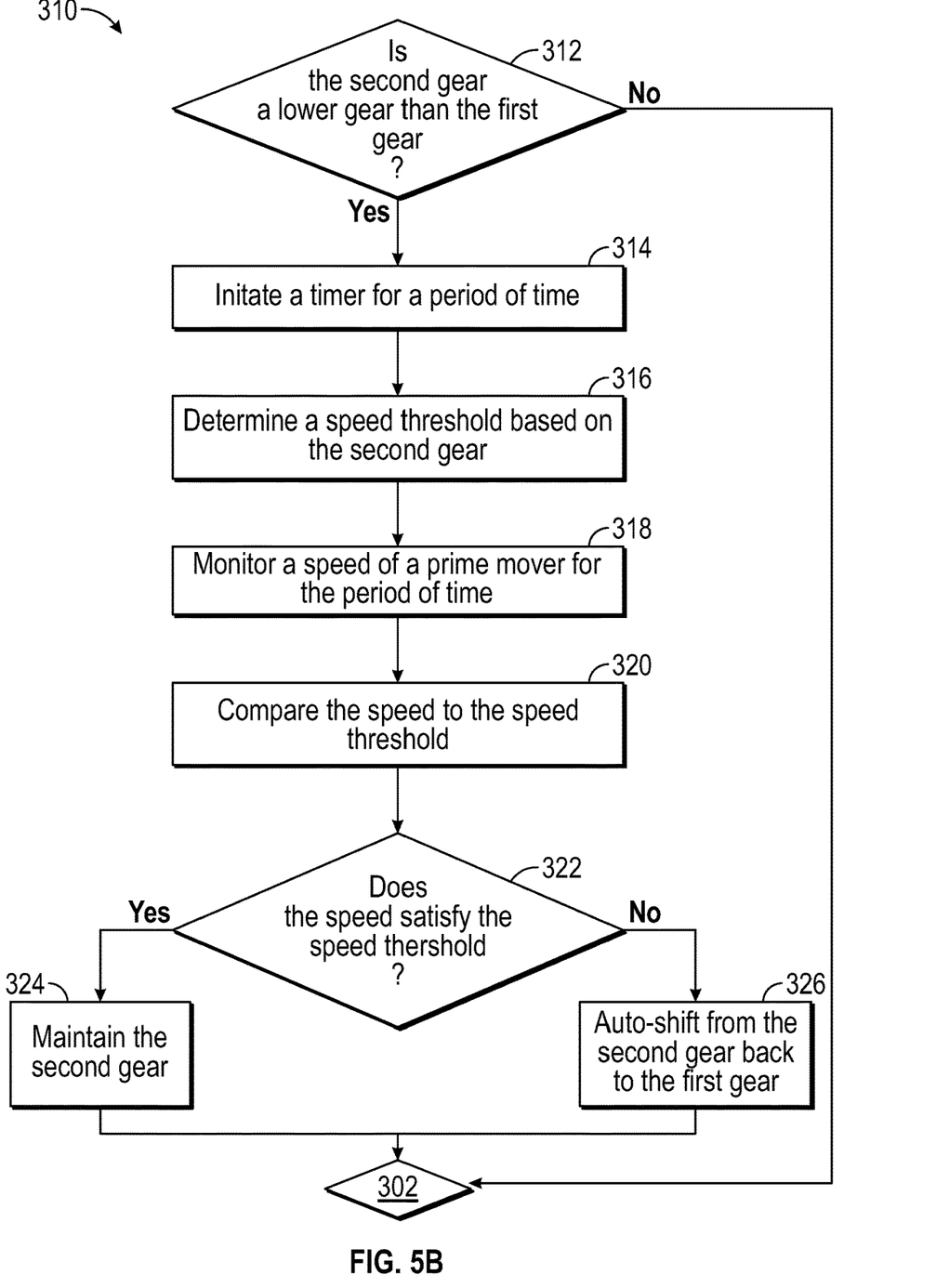

Referring to FIGS. 5A and 5B, the method 300 is shown, according to an exemplary embodiment. The method 300 may be performed by the controller 210 of the control system 200 to control shifting of the transmission 56 of the vehicle 10 to prevent overspeeding of the clutch 57 and/or the transmission 56. At step 302, the controller 210 is configured to monitor for and detect whether a shift request regarding shifting of the transmission 56 is present while the clutch 57 is engaged. The shift request may be provided by the operator of the vehicle 10 via the operator interface 40. In some embodiments, the shift request is provided via an electronic gear shifter/selector of the operator interface 40. In such embodiments, the controller 210 is configured to perform step 304 by implementing the shift request by shifting the transmission 56 from a first, current gear to a second, requested gear. In some embodiments, the shift request is provided via a manual gear shifter and clutch pedal of the operator interface 40. In such embodiments, the controller 210 does not perform step 304.

At step 306, the controller 210 is configured to determine whether the shift to the second gear has been completed. By way of example, with a manual gear shifter, the operator may initiate but not complete the shift from the first gear to the second gear and, instead, maintain the first gear. By way of another example, with an electronic gear shifter, the controller 210 may be unable to complete the shift from the first gear to the second gear (for a variety of reasons, such as a malfunction). In response to the controller 210 determining that the shift to the second gear is not completed, the controller 210 is configured to return to step 302 and wait for another shift request. In response to the controller 210 determining that the shift to the second gear is completed, the controller 210 is configured to proceed to step 308.

At step 308, the controller 210 is configured to determine whether the second gear is a forward gear. In response to the controller 210 determining that the second gear is a forward gear, the controller 210 is configured to proceed to step 310. At step 310, the controller 210 is configured to perform a transmission auto-shift procedure (including steps 312-326). In response to the controller 210 determining that the second gear is a reverse gear, the controller 210 is configured to refrain from performing the transmission auto-shift procedure of step 310 and return to step 302 and wait for another shift request.

At step 312 of the transmission auto-shift procedure, the controller 210 is configured to determine whether the second gear is a lower gear than the first gear (i.e., a downshift event). In response to the controller 210 determining that the second gear is a lower gear (i.e., a downshift event), the controller 210 is configured to proceed to step 314. In response to the controller 210 determining that the second gear is a higher gear (i.e., an upshift event), the controller 210 is configured to return to step 302 and wait for another shift request.

At step 314 of the transmission auto-shift procedure, the controller 210 is configured to initiate a timer for a period of time. In one embodiment, the period of time is about one second. In another embodiment, the period of time is about two seconds. In still another embodiment, the period of time is between one second and two seconds. In other embodiments, the period of time is less than one second or greater than two seconds (e.g., depending on the robustness of the clutch 57 and/or the transmission 56 and the loading/impulse capable of being handled thereby).

At step 316 of the transmission auto-shift procedure, the controller 210 is configured to determine a speed threshold for the prime mover 52 that presents a risk of damaging the clutch 57 and/or the transmission 56 based on the second gear. The speed threshold may be predetermined and stored in the memory 214. In some embodiments, the speed threshold varies for each gear of the transmission 56. In some embodiments, the speed threshold is consistent or the same across all gears of the transmission 56. At step 318 of the transmission auto-shift procedure, the controller 210 is configured monitor a speed of the prime mover 52 for the period of time. At step 320 of the transmission auto-shift procedure, the controller 210 is configured to compare the speed to the speed threshold during and/or following the expiration of the period of time.

At step 322 of the transmission auto-shift procedure, following the expiration of the period of time, the controller 210 is configured to determine whether the speed satisfies the speed threshold (i.e., does not exceed the speed threshold in a downshift event). In response to the speed satisfying the speed threshold (i.e., not exceeding the speed threshold, no overspeeding condition being present), the controller 210 is configured to proceed to step 324. At step 324 of the transmission auto-shift procedure, the controller 210 is configured to permit the shift and maintain the transmission 56 in the second gear. In response to the speed not satisfying the speed threshold (i.e., exceeding the speed threshold, an overspeeding condition being present), the controller 210 is configured to proceed to step 326. At step 326 of the transmission auto-shift procedure, the controller 210 is configured to auto-shift (e.g., automatically upshift, etc.) the transmission 56 from the second gear back to the first gear to prevent the overspeeding condition for an extended period of time and prevent the risk of damage to the clutch 57 and/or the transmission 56. Following step 324 or step 326, the controller 210 returns to step 302 and waits for another shift event.

In some embodiments, the speed threshold includes a first threshold and a second threshold. In such embodiments, at step 320, the controller 210 may be configured compare the speed during the period of time to the first speed threshold and then transition to comparing the speed during the period of time to the second speed threshold. By way of example, the first speed threshold may apply to the speed during a first portion of the period of time (e.g., immediately following the shift event) and the second speed threshold may apply to a second, later portion of the period of time. By way of another example, the controller 210 may be configured to only compare the speed to the second threshold if the first threshold is not satisfied by the speed (e.g., exceeded by the speed).

While the transmission auto-shift procedure of step 310 is described herein as applying to a downshift event to prevent an overspeeding condition following the downshift event to protect the clutch 57 and/or the transmission 56 from risk of damage, the transmission auto-shift procedure can similarly be applied to an upshift event to prevent an underspeeding condition following the upshift event to prevent stalling of the prime mover 52 (i.e., if "no" at step 312; the controller 210 may be configured to apply a similar process as steps 314-326, but for an upshift event, and determine whether a downshift is necessary). By way of example, the controller 210 may be configured to monitor operational characteristics of the driveline 50 (e.g., engagement/disengagement of the clutch 57, gear selection of the transmission 56, speed of the prime mover 52, direction of travel (forward or reverse) of the vehicle 10, etc.) during a transmission shift event (e.g., an upshift event, etc.) and determine whether to implement an automatic shift (e.g., downshift, etc.) or to maintain the selected gear based on the operational characteristics (e.g., the prime mover 52 operating at too low of a speed and likely to stall, etc.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the control system 200, etc.) as shown in the various exemplary embodiments is illustrative only. Additionally, any element disclosed in one embodiment may be incorporated or utilized with any other embodiment disclosed herein.

The invention claimed is:

1. A system comprising:
a driveline including:
an engine;
a transmission; and
a clutch positioned to selectively couple the engine to the transmission;
a user interface configured to facilitate operator shifting of the transmission; and
a control system configured to perform a transmission auto-shift procedure where the control system is configured to:
monitor engine speed of the engine for a period of time following completion of a downshift event with the transmission from a first, higher gear to a second, lower gear;
compare the engine speed to at least one speed threshold; and
automatically upshift the transmission from the second, lower gear back to the first, higher gear in response to the engine speed exceeding the at least one speed threshold during the period of time.

2. The system of claim 1, wherein the period of time is about one second.

3. The system of claim 1, wherein the period of time is about two seconds.

4. The system of claim 1, wherein the period of time is between one and two seconds.

5. The system of claim 1, wherein the at least one speed threshold is based on at least one of the first, higher gear or the second, lower gear.

6. The system of claim 1, wherein the at least one speed threshold is based on the second, lower gear.

7. The system of claim 1, wherein the at least one speed threshold includes a single threshold.

8. The system of claim 1, wherein the at least one speed threshold includes a first speed threshold and a second speed threshold, and wherein the control system is configured to transition from the first speed threshold to the second speed threshold during the period of time.

9. The system of claim 1, wherein the control system is configured to:
 determine whether the second, lower gear is a forward gear or a reverse gear; and
 in response to:
  (i) the second, lower gear being a reverse gear, refrain from performing the transmission auto-shift procedure; or
  (ii) the second, lower gear being a forward gear, perform the transmission auto-shift procedure.

10. The system of claim 1, wherein the control system is configured to:
 automatically upshift the transmission from the second, lower gear back to the first, higher gear (i) following expiration of the period of time and (ii) in response to the engine speed exceeding the at least one speed threshold during the period of time; and
 maintain the second, lower gear (i) following the expiration of the period of time and (ii) in response to the engine speed not exceeding the at least one speed threshold during the period of time.

11. The system of claim 1, wherein the system is a machine including a chassis, a front axle coupled to the chassis, and a rear axle coupled to the chassis, and wherein the driveline is coupled to the chassis and at least one of the front axle or the rear axle.

12. A method for performing an auto-shift procedure of a transmission of a machine, the method comprising:
 monitoring, by a processing circuit, engine speed of an engine of the machine for a period of time following completion of a shift event with the transmission from a first gear to a second gear;
 comparing, by the processing circuit, the engine speed during the period of time to a speed threshold; and
 automatically shifting, by the processing circuit, the transmission from the second gear back to the first gear (i) following expiration of the period of time and (ii) in response to the engine speed not satisfying the speed threshold during the period of time.

13. The method of claim 12, wherein the processing circuit does not perform the auto-shift procedure if the second gear is a reverse gear, and wherein the second gear is a lower gear than the first gear such that the shift event is a downshift event.

14. The method of claim 12, wherein the speed threshold is based on the second gear.

15. The method of claim 12, wherein the speed threshold includes a first speed threshold and a second speed threshold, further comprising transitioning, by the processing circuit, from the first speed threshold to the second speed threshold during the period of time.

16. A system comprising:
 a control system configured to perform a transmission auto-shift procedure where the control system is configured to:
  monitor engine speed of an engine for a period of time following completion of a shift event with a transmission from a first gear to a second gear;
  compare the engine speed to a speed threshold; and
  automatically return the transmission from the second gear back to the first gear (i) following expiration of the period of time and (ii) in response to the engine speed not satisfying the speed threshold during the period of time.

17. The system of claim 16, wherein the second gear is a lower gear than the first gear such that the shift event is a downshift event.

18. The system of claim 16, wherein the speed threshold is based on the second gear.

19. The system of claim 16, wherein the control system does not perform the transmission auto-shift procedure if the second gear is a reverse gear.

20. The system of claim 16, wherein the speed threshold includes a first speed threshold and a second speed threshold, and wherein the control system is configured to transition from the first speed threshold to the second speed threshold during the period of time.

* * * * *